(12) United States Patent
Kugo et al.

(10) Patent No.: US 10,774,790 B2
(45) Date of Patent: Sep. 15, 2020

(54) PURGE SYSTEM MALFUNCTION DIAGNOSIS DEVICE

(71) Applicant: SUBARU CORPORATION, Tokyo (JP)

(72) Inventors: Daisuke Kugo, Tokyo (JP); Naoki Matsumoto, Tokyo (JP); Atsushi Kaneko, Tokyo (JP); Yoshitaka Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 85 days.

(21) Appl. No.: 16/239,644

(22) Filed: Jan. 4, 2019

(65) Prior Publication Data

US 2019/0249623 A1 Aug. 15, 2019

(30) Foreign Application Priority Data

Feb. 14, 2018 (JP) .................. 2018-024474

(51) Int. Cl.
*F02M 25/08* (2006.01)
*F02D 41/00* (2006.01)

(52) U.S. Cl.
CPC ....... *F02M 25/0818* (2013.01); *F02D 41/004* (2013.01); *F02M 25/0809* (2013.01); *F02M 25/0836* (2013.01)

(58) Field of Classification Search
CPC .................................................... F02D 41/004

(Continued)

(56) References Cited

U.S. PATENT DOCUMENTS 4,608,208 A * 8/1986 Yogo .................. F02M 5/08
236/101 C
4,700,682 A * 10/1987 Ota .................... F02M 25/0836
123/516

(Continued)

FOREIGN PATENT DOCUMENTS

EP 3 418 547 A1 12/2018
JP 2001-12313 A 1/2001

(Continued)

OTHER PUBLICATIONS

Notice for Reasons for Refusal issued in corresponding Japanese Patent Application No. 2018-024474 dated Aug. 27, 2019.

*Primary Examiner* — Jacob M Amick
*Assistant Examiner* — Michael A Kessler
(74) *Attorney, Agent, or Firm* — Troutman Pepper Hamilton Sanders LLP

(57) ABSTRACT

A purge system malfunction diagnosis device is configured to diagnose a malfunction in a purge system mounted on a vehicle configured to execute an idling stop control. The system includes a canister, a purge passage, a purge valve capable of opening and closing the purge passage, an outside air passage that causes the canister to communicate with an outside air opening, an outside air valve capable of opening and closing the outside air passage by being driven using an electric power supplied from a battery, and a system pressure sensor that detects a pressure in the purge system. In a state where the outside air passage is closed, a diagnosis mode is executed on a basis of a relationship between the pressure in the purge system and an integrated value of flow rate estimates of a purge gas, and the diagnosis mode is prohibited on a basis of a voltage of the battery.

17 Claims, 9 Drawing Sheets

(58) Field of Classification Search
USPC .............................. 123/518–520; 73/114.39
See application file for complete search history.

(56) References Cited

U.S. PATENT DOCUMENTS

| | | | |
|---|---|---|---|
| 6,712,049 B2* | 3/2004 | Kawano | F02M 25/0809 |
| | | | 123/520 |
| 2004/0173013 A1* | 9/2004 | Kobayashi | F02M 25/0818 |
| | | | 73/114.41 |
| 2014/0224212 A1* | 8/2014 | Tamura | G01M 15/04 |
| | | | 123/434 |
| 2015/0361929 A1* | 12/2015 | Tamura | F02M 25/0809 |
| | | | 73/114.39 |
| 2019/0249621 A1* | 8/2019 | Kugo | F02M 25/0809 |

FOREIGN PATENT DOCUMENTS

| | | | | |
|---|---|---|---|---|
| JP | 2001012313 A | * | 1/2001 | |
| JP | 2006-291728 A | | 10/2006 | |
| JP | 2006-336483 A | | 12/2006 | |
| JP | 2007218148 A | * | 8/2007 | |
| JP | 2010275985 A | * | 12/2010 | |
| JP | 2011-032919 A | | 2/2011 | |
| JP | 2017-172432 A | | 9/2017 | |

\* cited by examiner

PURGE SYSTEM MALFUNCTION DIAGNOSIS DEVICE

CROSS-REFERENCE TO RELATED APPLICATIONS

The present application claims priority from Japanese Patent Application No. 2018-024474 filed on Feb. 14, 2018, the entire contents of which are hereby incorporated by reference.

BACKGROUND

1. Technical Field

The present invention relates to a purge system malfunction diagnosis device.

2. Related Art

A purge system has been used in order to prevent evaporated fuel that is generated in a fuel tank mounted on a vehicle from being released into the outside air. Specifically, the purge system includes a canister that adsorbs evaporated fuel, a purge passage that causes the canister to communicate with an intake pipe of an engine, and a purge valve capable of opening and closing the purge passage (for instance, see Japanese Unexamined Patent Application Publication No. 2011-032919).

In the purge system, the purge valve opens the purge passage, and thereby purge gas that is gas including evaporated fuel adsorbed onto the canister flows into the intake pipe from the purge passage. The purge gas that has flowed into the intake pipe from the purge passage is sent to a combustion chamber of the engine together with intake air that flows in the intake pipe. In addition, flow of the purge gas into the intake pipe from the purge passage enables an amount of evaporated fuel adsorbed onto the canister to be prevented from reaching an upper limit of an amount that can be adsorbed. This makes it possible to continuously prevent evaporated fuel from being released into outside air.

As described above, a purge flow that is a flow of purge gas from the purge passage to the intake pipe has an influence on burning of fuel in the engine and adsorption ability of the canister. In the case where the purge system is malfunctioning, the purge flow is not performed normally, which makes it difficult to appropriately control burning of fuel in the engine and adsorption ability of the canister. Therefore, it is necessary to diagnose a malfunction in the purge system.

Such diagnosis of a malfunction in the purge system is performed on the basis of pressure in the purge system detected in a state where an outside air passage that causes the canister to communicate with an outside air opening is closed by an outside air valve capable of opening and closing the outside air passage. Here, in some cases, control is performed in which a diagnosis mode of diagnosing a malfunction in the purge system is prohibited on the basis of a voltage of a battery that supplies electric power to the outside air valve. Specifically, the diagnosis mode may be prohibited in the case where the voltage of the battery becomes excessively low. Thus, in a situation in which it is difficult to appropriately control operation of the outside air valve, execution of the diagnosis mode involving operation of the outside air valve is suppressed.

SUMMARY OF THE INVENTION

An aspect of the present invention provides a purge system malfunction diagnosis device. The device is configured to diagnose a malfunction in a purge system. The purge system is mounted on a vehicle configured to execute an idling stop control of automatically stopping and restarting an engine, and configured to supply a purge gas including an evaporated fuel generated in a fuel tank to an intake pipe of the engine. The purge system includes a canister configured to adsorb the evaporated fuel, a purge passage configured to cause the canister to communicate with the intake pipe of the engine, a purge valve capable of opening and closing the purge passage, an outside air passage configured to cause the canister to communicate with an outside air opening, an outside air valve capable of opening and closing the outside air passage by being driven using an electric power supplied from a battery configured to store an electric power to be used for a start of the engine, and a system pressure sensor configured to detect a pressure in the purge system. The purge system malfunction diagnosis device includes an execution module configured to, in a state where the outside air passage is closed by the outside air valve, execute a diagnosis mode of diagnosing a malfunction in the purge system on a basis of a relationship between the pressure in the purge system and an integrated value of flow rate estimates of a purge gas that flows into the intake pipe from the purge passage by the purge passage being opened by the purge valve, and prohibit the diagnosis mode on a basis of a voltage of the battery. The execution module cancels the prohibition of the diagnosis mode based on the voltage of the battery when the engine restarts after an automatic stop.

An aspect of the present invention provides a purge system malfunction diagnosis device. The device is configured to diagnose a malfunction in a purge system. The purge system is mounted on a vehicle configured to execute an idling stop control of automatically stopping and restarting an engine, and configured to supply a purge gas including an evaporated fuel generated in a fuel tank to an intake pipe of the engine. The purge system includes a canister configured to adsorb the evaporated fuel, a purge passage configured to cause the canister to communicate with the intake pipe of the engine, a purge valve capable of opening and closing the purge passage, an outside air passage configured to cause the canister to communicate with an outside air opening, an outside air valve capable of opening and closing the outside air passage by being driven using an electric power supplied from a battery configured to store an electric power to be used for a start of the engine, and a system pressure sensor configured to detect a pressure in the purge system. The purge system malfunction diagnosis device includes circuitry configured to, in a state where the outside air passage is closed by the outside air valve, execute a diagnosis mode of diagnosing a malfunction in the purge system on a basis of a relationship between the pressure in the purge system and an integrated value of flow rate estimates of a purge gas that flows into the intake pipe from the purge passage by the purge passage being opened by the purge valve, and prohibit the diagnosis mode on a basis of a voltage of the battery. The execution module cancels the prohibition of the diagnosis mode based on the voltage of the battery when the engine restarts after an automatic stop.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted. In the case where a purge system is mounted on a vehicle that executes idling stop control of automatically stopping and restarting an engine, a restart of the engine may cause a diagnosis mode to be prohibited by a temporary decrease in a voltage of a battery. Thus, for instance, the diagnosis mode is unnecessarily interrupted before diagnosis of a malfunction in the purge system is completed in some cases.

It is desirable to provide a novel and improved purge system malfunction diagnosis device capable of appropriately completing diagnosis of a malfunction in a purge system.

1. CONFIGURATION OF PURGE SYSTEM

First, a configuration of a purge system 1 according to an example of the present invention is described with reference to FIGS. 1 to 3.

Figure 1:
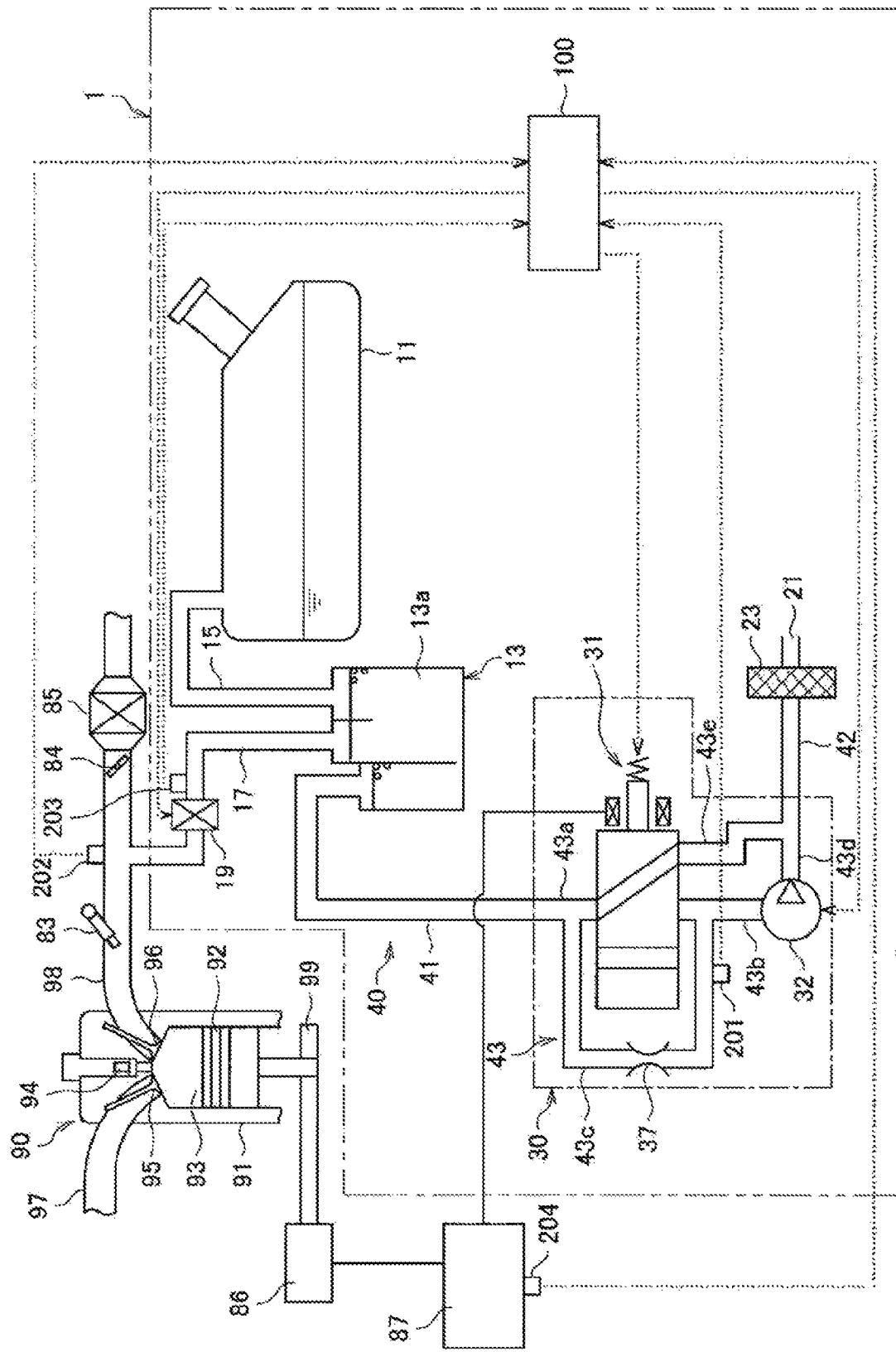
FIG. 1 is a schematic diagram illustrating an instance of a schematic configuration of a purge system according to an example of the present invention.

FIG. 1 is a schematic diagram illustrating an instance of a schematic configuration of the purge system 1 according to the present example. FIG. 2 is a schematic diagram illustrating the purge system 1 according to the present example when an outside air valve 31 is in a closed state. FIG. 3 is a block diagram illustrating an instance of a functional configuration of a control device 100 according to the present example.

The purge system 1 is a system that is mounted on a vehicle that executes idling stop control of automatically stopping and restarting an engine, and supplies purge gas including evaporated fuel generated in a fuel tank to an intake pipe of the engine. For instance, as illustrated in FIG. 1, the purge system 1 includes a fuel tank 11, a canister 13, an evaporation passage 15, a purge passage 17, a purge valve 19, an outside air passage 40, a leak detection device 30, and the control device 100. In an example of the present invention, the control device 100 functions as a malfunction diagnosis device that diagnoses a malfunction in the purge system 1.

In addition, FIG. 1 illustrates an instance of an engine 90 to which the purge system 1 is applied.

The engine 90 is, for instance, a spark ignition internal combustion engine. The engine 90 is provided with one or a plurality of cylinders 91. Inside the cylinder 91 is formed a combustion chamber 93, and an ignition plug 94 is provided toward the combustion chamber 93. An intake port and an exhaust port of the cylinder 91 are coupled respectively to an intake pipe 98 and an exhaust pipe 97. Opening and closing of an intake valve 96 and an exhaust valve 95 provided respectively for the intake port and the exhaust port of the cylinder 91 causes intake air to be taken into the combustion chamber 93 and exhaust air to be let out from the combustion chamber 93. In the combustion chamber 93, mixed gas including air and fuel is formed, and the mixed gas is caused to burn by ignition of the ignition plug 94. Thus, a piston 92 makes a linear reciprocating motion in the cylinder 91, and power is transmitted to a crankshaft 99 coupled to the piston 92.

An output shaft of a starter motor 86 is coupled to the crankshaft 99. The starter motor 86 is driven using electric power supplied from a battery 87. Power output by the starter motor 86 being driven is transmitted to the crankshaft 99. This enables the engine 90 to be started. Thus, the battery 87 stores electric power to be used for a start of the engine 90. In addition, the vehicle equipped with the purge system 1 is provided with a voltage sensor 204 that detects a battery voltage that is a voltage of the battery 87. The voltage sensor 204 outputs an acquired detection result. The voltage sensor 204 is provided near the battery 87, for instance.

The vehicle equipped with the purge system 1 executes idling stop control of automatically stopping and restarting the engine 90. Specifically, idling stop control may be executed by an operation command being output to the engine 90 from a control device different from the control device 100. In idling stop control, in the case where an automatic stop condition is satisfied, automatic stop control of stopping idle operation of the engine 90 regardless of driver operation is executed. Whether the automatic stop condition is satisfied may be determined on the basis of, for instance, amounts of operation of a brake pedal and an acceleration pedal, a position of a shift lever, and a vehicle speed. In addition, in idling stop control, in the case where a restart condition is satisfied after an automatic stop of the engine 90, restart control of starting the engine 90 regardless of driver operation is executed. The restart condition is, for instance, that the automatic stop condition is no longer satisfied after an automatic stop of the engine 90.

The intake pipe 98 is coupled to an inlet from which outside air is taken in from the outside of the vehicle. The intake pipe 98 is provided with an air cleaner 85, for instance, and on the downstream side of the intake pipe 98 with respect to the air cleaner 85, a throttle valve 84 capable of adjusting an amount of intake air that is an amount of intake air taken into the intake pipe 98 is provided. On the downstream side of the intake pipe 98 with respect to the throttle valve 84, a fuel injection valve 83 that injects fuel is provided. The fuel injection valve 83 injects, into the intake pipe 98, fuel that is supplied from the fuel tank 11 via an oil path (not illustrated). Note that the fuel injection valve 83 may be provided for the cylinder 91 and be capable of injecting fuel toward the combustion chamber 93. In addition, operation of the fuel injection valve 83 is controlled by, for instance, a control device different from the control device 100. Specifically, the intake pipe 98 branches toward the intake port side of each cylinder 91 of the engine 90, and is coupled to each intake port. To the intake pipe 98 of the engine 90 is coupled the purge passage 17 described later.

The intake pipe 98 is provided with an intake pipe pressure sensor 202 that detects intake pipe pressure that is pressure in the intake pipe 98. Specifically, the intake pipe pressure sensor 202 acquires, as a detection result, a relative value of intake pipe pressure with respect to atmospheric pressure. The intake pipe pressure sensor 202 outputs the acquired detection result. The intake pipe pressure sensor 202 is, for instance, provided in a portion of the intake pipe 98 that is coupled to the purge passage 17.

The fuel tank 11 stores liquid fuel such as gasoline to be supplied to the engine 90. In the fuel tank 11, evaporated fuel is generated by evaporation of part of the liquid fuel. Hence, liquid fuel and evaporated fuel coexist in the fuel tank 11. In addition, the fuel tank 11 communicates with the canister 13 via the evaporation passage 15. Hence, evaporated fuel generated in the fuel tank 11 is guided to the canister 13 via the evaporation passage 15.

The canister 13 adsorbs evaporated fuel. Specifically, the canister 13 adsorbs evaporated fuel guided from the fuel tank 11 via the evaporation passage 15. More specifically, activated carbon 13a serving as an adsorbent is provided in the canister 13, and the activated carbon 13a adsorbs evaporated fuel guided into the canister 13. The canister 13 communicates with the intake pipe 98 of the engine 90 via the purge passage 17. The purge passage 17 may be, for instance, coupled to a portion of the intake pipe 98 that is on the downstream side with respect to the throttle valve 84 and on the upstream side with respect to the fuel injection valve 83. The purge passage 17 is provided with the purge valve 19.

The purge valve 19 is a control valve capable of opening and closing the purge passage 17. As the purge valve 19, for instance, a control valve capable of adjusting an opening degree between a completely closed state and a completely open state is used. In the case where the purge passage 17 is opened by the purge valve 19, the canister 13 communicates with the intake pipe 98 of the engine 90. In the case where the purge passage 17 is closed by the purge valve 19, the canister 13 is shut off from the intake pipe 98 of the engine 90.

The purge passage 17 is provided with a purge valve opening degree sensor 203 that detects the opening degree of the purge valve 19. The purge valve opening degree sensor 203 outputs an acquired detection result. The purge valve opening degree sensor 203 is provided, for instance, in a portion of the purge passage 17 that is near the purge valve 19.

In addition, the canister 13 communicates with an outside air opening 21 via the outside air passage 40. The outside air opening 21 is an opening that is open to the outside of the vehicle. The outside air passage 40 is provided with the leak detection device 30. Specifically, the outside air passage 40 includes a canister-side passage 41 that couples the canister 13 to the leak detection device 30, an outside air opening-side passage 42 that couples the leak detection device 30 to the outside air opening 21, and an internal passage 43 of the leak detection device 30. The outside air opening-side passage 42 is provided with a drain filter 23.

The leak detection device 30 is a device that detects whether there is a leak of evaporated fuel to the outside from the inside of the purge system 1. A leak of evaporated fuel may occur in the case where, for instance, a through hole penetrating a passage from the inside to the outside is formed in the passage of the purge system 1.

The leak detection device 30 includes, for instance, the internal passage 43, the outside air valve 31, and a pump 32.

The internal passage 43 includes, for instance, a first passage 43a, a second passage 43b, a third passage 43c, a fourth passage 43d, and a fifth passage 43e. The first passage 43a couples the canister-side passage 41 to a port of the outside air valve 31 on the canister 13 side. The second passage 43b couples a port of the outside air valve 31 on the outside air opening 21 side to the intake side of the pump 32. The third passage 43c causes the first passage 43a to communicate with the second passage 43b. The third passage 43c is provided with an orifice 37. The fourth passage 43d couples the discharge side of the pump 32 to the outside air opening-side passage 42. The fifth passage 43e couples a port of the outside air valve 31 on the outside air opening 21 side that is different from the port coupled to the second passage 43b to the fourth passage 43d.

In addition, the internal passage 43 is provided with a system pressure sensor 201 that detects system pressure that is pressure in the purge system 1. Specifically, the system pressure sensor 201 acquires, as a detection result, a relative value of system pressure with respect to atmospheric pressure. The system pressure sensor 201 outputs the acquired detection result. The system pressure sensor 201 is provided, for instance, on the second passage 43b side of the third passage 43c with respect to the orifice 37.

The outside air valve 31 is a control valve capable of switching a communication state in the internal passage 43 of the leak detection device 30. As the outside air valve 31, for instance, a solenoid valve is used. Specifically, the outside air valve 31 is capable of switching a communication state between a passage coupled to the port on the canister 13 side and a passage coupled to the port on the outside air opening 21 side. The outside air valve 31 is driven using electric power supplied from the battery 87.

Specifically, as illustrated in FIG. 1, the outside air valve 31 is capable of switching a communication state in the internal passage 43 in a manner that the first passage 43a communicates with the fifth passage 43e. In the case where the first passage 43a communicates with the fifth passage 43e, the canister 13 communicates with the outside air opening 21. Hence, in this case, the outside air passage 40 is opened. Note that a state of the outside air valve 31 in this case will be referred to as an open state. Specifically, the outside air valve 31 is in an open state when not energized.

Figure 2:
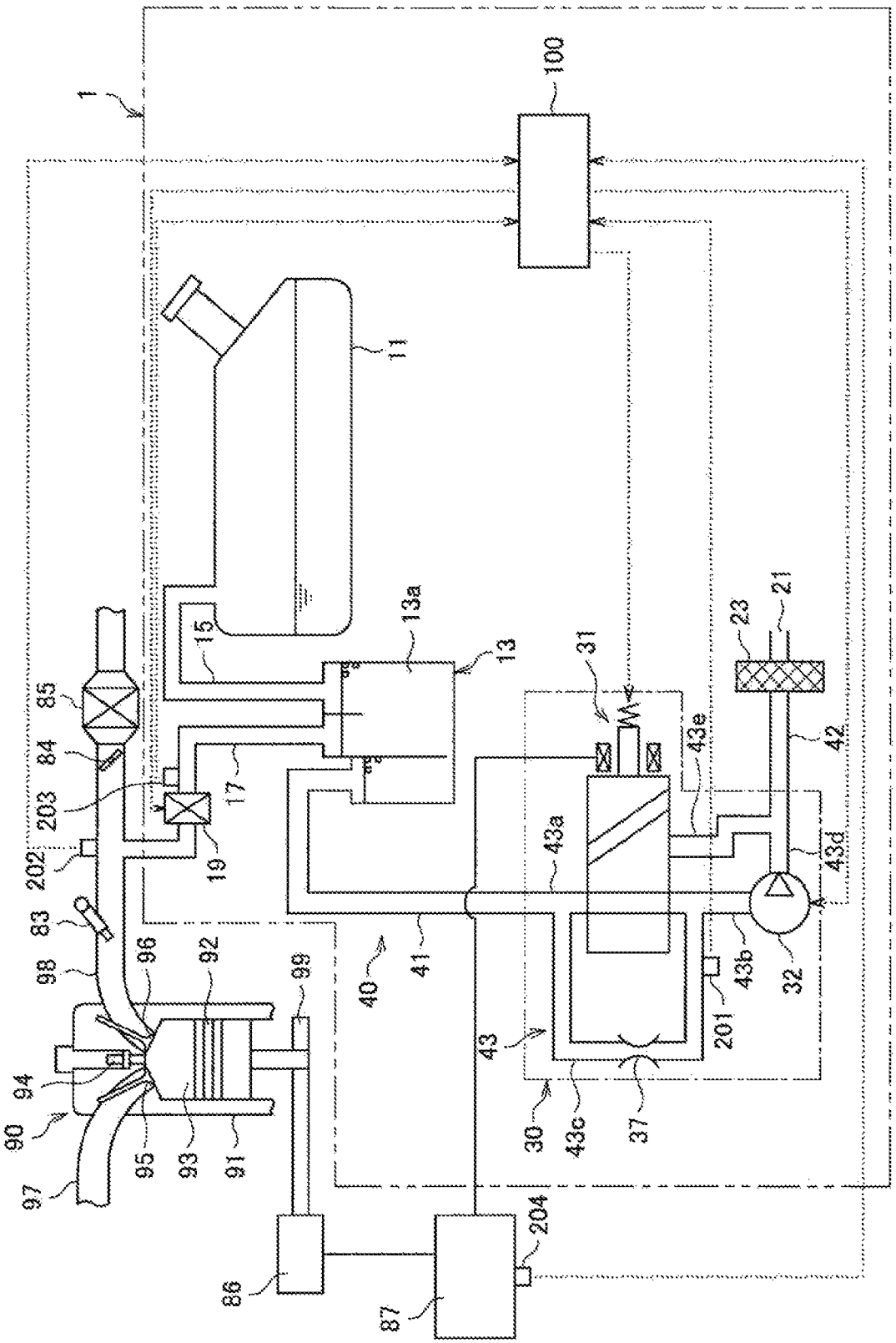
FIG. 2 is a schematic diagram illustrating the purge system according to the example when an outside air valve is in a closed state.

In addition, as illustrated in FIG. 2, the outside air valve 31 is capable of switching a communication state in the internal passage 43 in a manner that the first passage 43a communicates with the second passage 43b. In the case where the first passage 43a communicates with the second passage 43b, the canister 13 is shut off from the outside air opening 21. Hence, in this case, the outside air passage 40 is closed. Note that a state of the outside air valve 31 in this case will be referred to as a closed state. Specifically, the outside air valve 31 is in a closed state when energized.

Thus, the outside air valve 31 is a control valve capable of opening and closing the outside air passage 40. Specifically, in normal time when a diagnosis mode described later is not executed, the outside air valve 31 is in an open state, and the outside air passage 40 is opened by the outside air valve 31. At the time of execution of the diagnosis mode described later, the outside air valve 31 is in a closed state, and the outside air passage 40 is closed by the outside air valve 31.

The pump 32 sucks out gas from the intake side to the discharge side. Specifically, as will be described later, in detection of whether there is a leak of evaporated fuel, the pump 32 is driven, and thereby gas in the purge system 1 is sucked out from the second passage 43b to the outside of the vehicle via the fourth passage 43d and the outside air opening 21.

The control device 100 includes a central processing unit (CPU) being an arithmetic processing unit, a read only memory (ROM) being a memory element that stores programs, calculation parameters etc. that are used by the CPU, a random access memory (RAM) being a memory element that temporarily stores parameters changing as appropriate in execution of the CPU, etc., and the like.

In addition, the control device 100 receives information output from each device. Communication between the control device 100 and each device is enabled by, for instance, controller area network (CAN) communication. For instance, the control device 100 receives information output from the system pressure sensor 201, the intake pipe pressure sensor 202, the purge valve opening degree sensor 203, and the voltage sensor 204. In addition, for instance, the control device 100 receives, from a control device that executes idling stop control, information indicating whether automatic stop control of the engine 90 is being executed and information indicating whether restart control of the engine 90 is being executed.

Figure 3:
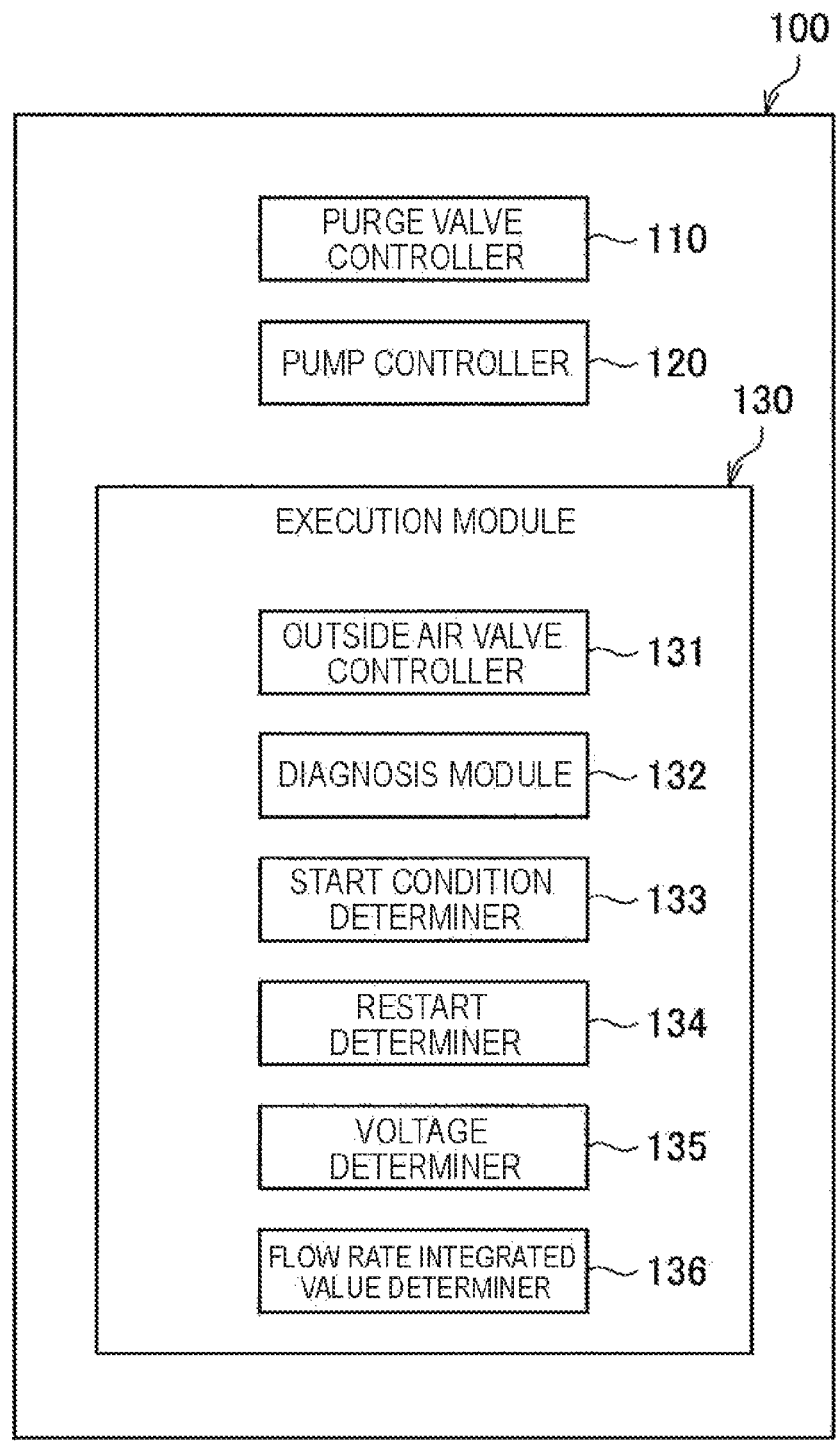
FIG. 3 is a block diagram illustrating an instance of a functional configuration of a control device according to the example.

As illustrated in FIG. 3, the control device 100 includes, for instance, a purge valve controller 110, a pump controller 120, and an execution module 130.

The purge valve controller 110 controls operation of the purge valve 19 by outputting an operation command to the purge valve 19. Thus, a valve opening degree of the purge valve 19 is controlled.

As described above, in the case where the purge passage 17 is opened by the purge valve 19, the canister 13 communicates with the intake pipe 98 of the engine 90. In addition, in normal time when the diagnosis mode described later is not executed, the outside air passage 40 is opened by the outside air valve 31. Hence, system pressure basically is a value relatively close to atmospheric pressure. On the other hand, pressure of the intake pipe 98 is lower than system pressure because of negative pressure generated in the intake pipe 98. Therefore, when the purge passage 17 is opened by the purge valve 19, a purge flow occurs, and purge gas including evaporated fuel flows into the intake pipe 98 from the purge passage 17. Consequently, a flow rate of purge gas that flows into the intake pipe 98 from the purge passage 17 is controlled by the valve opening degree of the purge valve 19 being controlled by the purge valve controller 110.

Specifically, the purge valve controller 110 controls the valve opening degree of the purge valve 19 on the basis of a traveling state of the vehicle. For instance, the purge valve controller 110 causes the purge valve 19 to open the purge passage 17 in the case where there is an acceleration request, and controls the valve opening degree of the purge valve 19 on the basis of an accelerator opening degree, intake pipe pressure, and the like.

The pump controller 120 controls operation of the pump 32 of the leak detection device 30 by outputting an operation command to the pump 32. Thus, sucking out of gas in the purge system 1 to the outside of the vehicle is controlled.

The execution module 130 executes a diagnosis mode of diagnosing a malfunction in the purge system 1. As illustrated in FIG. 3, the execution module 130 includes, for instance, an outside air valve controller 131, a diagnosis module 132, a start condition determiner 133, a restart determiner 134, a voltage determiner 135, and a flow rate integrated value determiner 136.

The outside air valve controller 131 controls operation of the outside air valve 31 of the leak detection device 30 by outputting an operation command to the outside air valve 31. Thus, switching of a communication state in the internal passage 43 of the leak detection device 30 is controlled. Hence, opening and closing of the outside air passage 40 by the outside air valve 31 is controlled.

The diagnosis module 132 diagnoses a malfunction in the purge system 1 in the diagnosis mode. Specifically, the diagnosis module 132 makes a diagnosis that the purge system 1 is malfunctioning in a situation in which a purge flow is not performed normally.

The start condition determiner 133, the restart determiner 134, the voltage determiner 135, and the flow rate integrated value determiner 136 perform various determinations on the basis of information acquired by the control device 100.

The control device 100 may detect whether there is a leak of evaporated fuel to the outside from the inside of the purge system 1 by using the leak detection device 30. Detection processing of a leak of evaporated fuel may be performed, for instance, during a stop of the vehicle.

Specifically, in detection processing of a leak of evaporated fuel, first, the control device 100 brings the purge valve 19 into a closed state and the outside air valve 31 into an open state. Thus, a communication state in the internal passage 43 of the leak detection device 30 enters a state where the first passage 43a communicates with the fifth passage 43e as illustrated in FIG. 1. Then, the control device 100 drives the pump 32. Hence, evaporated fuel in the third passage 43c provided with the orifice 37 is sucked out by the pump 32, and system pressure detected by the system pressure sensor 201 becomes reference pressure corresponding to an inner diameter of the orifice 37.

Next, the control device 100 keeps the purge valve 19 in a closed state, continues driving of the pump 32, and switches the outside air valve 31 to a closed state. Thus, a communication state in the internal passage 43 of the leak detection device 30 enters a state where the first passage 43a communicates with the second passage 43b as illustrated in FIG. 2. Hence, evaporated fuel in the first passage 43a is sucked out by the pump 32 via the second passage 43b. System pressure detected by the system pressure sensor 201 in this state will be referred to as determination pressure used for determining whether there is a leak of evaporated fuel. Then, the control device 100 compares the determination pressure with the reference pressure, thereby determining whether there is a leak of evaporated fuel to the outside from the inside of the purge system 1. Specifically, in the case where the determination pressure is higher than the reference pressure, it is determined that there is a leak of evaporated fuel to the outside from the inside of the purge system 1.

Functions of the control device 100 according to the present example may be distributed among a plurality of control devices. In that case, the plurality of control devices may be coupled to each other via a communication bus of a CAN or the like.

2. OPERATION OF CONTROL DEVICE

Now, operation of the control device 100 according to the present example will be described with reference to FIGS. 4 to 9.

Figure 4:
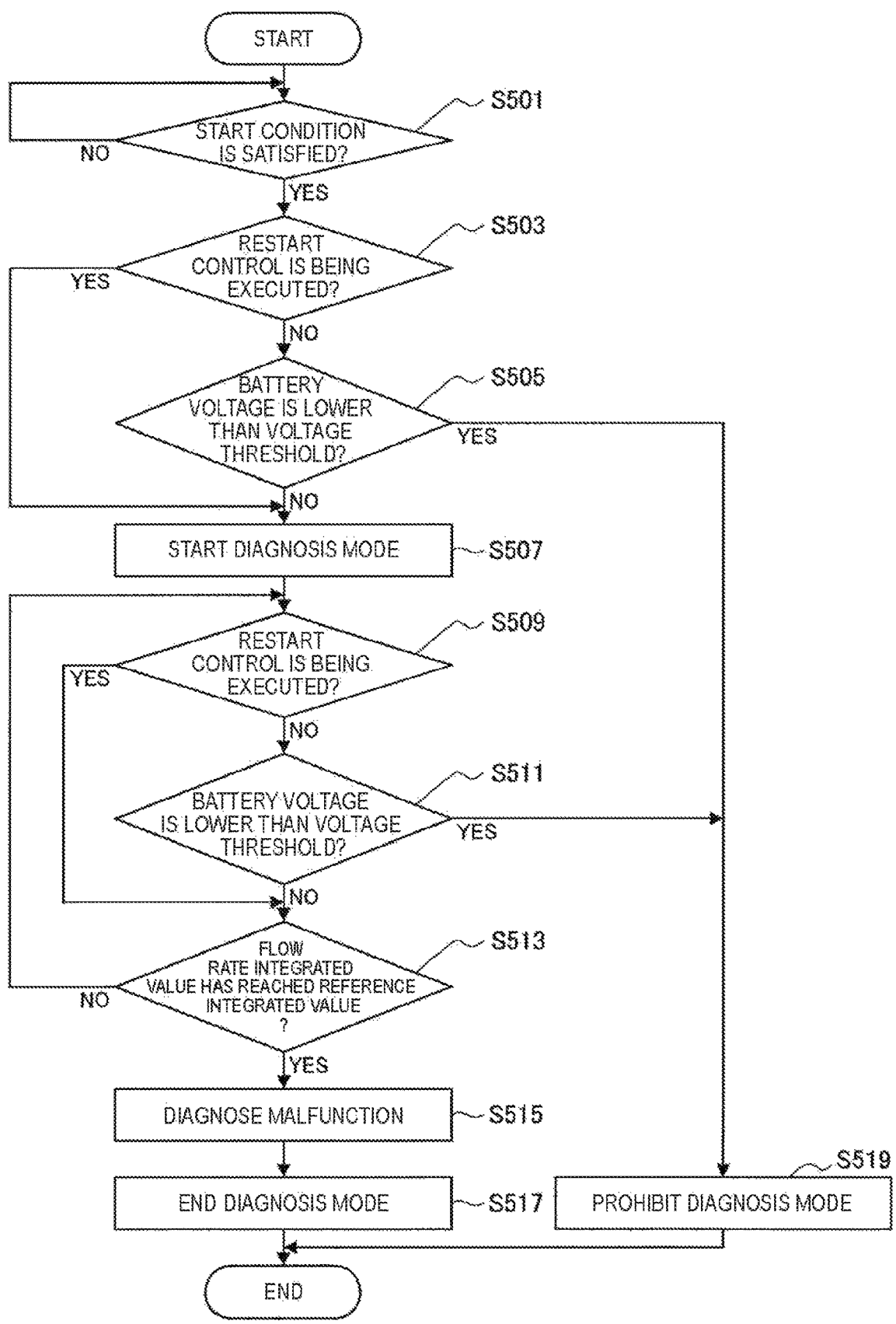
FIG. 4 is a flowchart illustrating an instance of a sequence of processing related to diagnosis performed by the control device according to the example.

FIG. 4 is a flowchart illustrating an instance of a sequence of processing related to diagnosis performed by the control device 100 according to the present example. The processing flow illustrated in FIG. 4 is, for instance, repeated at time intervals set in advance. Note that the processing flow illustrated in FIG. 4 is started in a state where the diagnosis mode is not started. In addition, at the time of execution of the processing flow illustrated in FIG. 4, the valve opening degree of the purge valve 19 is controlled on the basis of a traveling state of the vehicle as described above.

When the control flow illustrated in FIG. 4 is started, first, in step S501, the start condition determiner 133 determines whether a start condition that is a condition under which the diagnosis mode is started is satisfied. In the case where it is determined that the start condition is satisfied (YES in step S501), the processing goes to step S503. In the case where it is determined that the start condition is not satisfied (NO in step S501), the processing in step S501 is repeated.

Specifically, the start condition is a condition that enables determination of whether a state of the purge system 1, such as pressure distribution, temperature distribution, or concentration distribution of evaporated fuel in the purge system 1, is stable enough for the diagnosis mode to be executed appropriately.

For instance, the start condition determiner 133 may apply, as a start condition, elapse of reference time from a point in time when fuel cut of stopping supply of fuel to the engine 90 is started. The reference time may be, for instance, set as appropriate in accordance with design specifications or the like of the vehicle, and stored in a memory element of the control device 100. Specifically, fuel cut is started in the case where there is no longer an acceleration request because accelerator operation is interrupted when the vehicle is traveling. The control device 100 may receive information indicating whether fuel cut is being performed from, for instance, a control device that controls operation of the fuel injection valve 83.

In addition, for instance, the start condition determiner 133 may apply, as a start condition, switching of the purge valve 19 from a closed state to an open state. The purge valve 19 may be, for instance, switched from a closed state to an open state in the case where the vehicle makes a start by accelerator operation being performed when the vehicle is at a stop. In addition, the purge valve 19 may be, for instance, switched from a closed state to an open state in the case where an acceleration request occurs when the vehicle is traveling.

Note that the start condition determiner 133 may apply, as a start condition, the condition exemplified above as a start condition being satisfied and an integrated value of durations of the open state of the purge valve 19 after activation of a system of the vehicle being higher than a predetermined value. The predetermined value may be, for instance, set as appropriate in accordance with design specifications or the like of the vehicle, and stored in a memory element of the control device 100. Specifically, the system of the vehicle is activated by switching of an ignition switch from off to on.

In step S503, the restart determiner 134 determines whether restart control of the engine 90 is being executed. In the case where it is determined that restart control of the engine 90 is being executed (YES in step S503), the processing goes to step S507. In the case where it is determined that restart control of the engine 90 is not being executed (NO in step S503), the processing goes to step S505.

In step S505, the voltage determiner 135 determines whether a battery voltage is lower than a voltage threshold. In the case where it is determined that the battery voltage is lower than the voltage threshold (YES in step S505), the processing goes to step S519. In the case where it is determined that the battery voltage is not lower than the voltage threshold (NO in step S505), the processing goes to step S507.

Specifically, the voltage threshold may be set to a value that enables determination of whether the battery voltage is high enough for the operation of the outside air valve 31 to be controlled appropriately, and stored in a memory element of the control device 100.

In step S507, the execution module 130 starts the diagnosis mode. When the diagnosis mode is started, the outside air valve controller 131 brings the outside air valve 31 into a closed state. Thus, as illustrated in FIG. 2, the first passage 43*a* communicates with the second passage 43*b*, which causes the canister 13 to be shut off from the outside air opening 21, and the outside air passage 40 is closed. In addition, when the diagnosis mode is started, integration of flow rate estimates of purge gas (gas including evaporated fuel) that flows into the intake pipe 98 from the purge passage 17 by the purge passage 17 being opened by the purge valve 19 is started. This will be described in detail later.

Next, in step S509, the restart determiner 134 determines whether restart control of the engine 90 is being executed. In the case where it is determined that restart control of the engine 90 is being executed (YES in step S509), the processing goes to step S513. In the case where it is determined that restart control of the engine 90 is not being executed (NO in step S509), the processing goes to step S511.

In step S511, the voltage determiner 135 determines whether a battery voltage is lower than a voltage threshold. In the case where it is determined that the battery voltage is lower than the voltage threshold (YES in step S511), the processing goes to step S519. In the case where it is determined that the battery voltage is not lower than the voltage threshold (NO in step S511), the processing goes to step S513.

In step S513, the flow rate integrated value determiner 136 determines whether a flow rate integrated value that is an integrated value of flow rate estimates of purge gas that flows into the intake pipe 98 has reached a reference integrated value. In the case where it is determined that the flow rate integrated value has reached the reference integrated value (YES in step S513), the processing goes to step S515. In the case where it is determined that the flow rate integrated value has not reached the reference integrated value (NO in step S513), the processing returns to step S509.

Specifically, the flow rate estimate is a value estimated as a flow rate of purge gas that flows into the intake pipe 98 from the purge passage 17 when the purge system 1 is normal and a purge flow is performed normally. Specifically, the reference integrated value may be set to a value that enables determination of whether the flow rate integrated value is large enough for a malfunction in the purge system 1 to be diagnosed appropriately, and stored in a memory element of the control device 100.

Specifically, the flow rate integrated value determiner 136 may calculate a flow rate estimate of purge gas at each time, and integrate the flow rate estimates of purge gas, thereby calculating a flow rate integrated value. The flow rate estimate of purge gas at each time and the flow rate integrated value may be stored in a memory element of the control device 100, for instance.

For instance, the flow rate integrated value determiner 136 calculates the flow rate estimate of purge gas on the basis of intake pipe pressure and an opening degree of the purge valve 19. Specifically, the flow rate integrated value determiner 136 works out, by calculation, a larger value as the flow rate estimate of purge gas as the intake pipe pressure is lower. In addition, the flow rate integrated value determiner 136 works out, by calculation, a larger value as the flow rate estimate of purge gas as the opening degree of the purge valve 19 is larger. The flow rate integrated value determiner 136 may calculate the flow rate estimate of purge gas further on the basis of system pressure. Specifically, the flow rate integrated value determiner 136 works out, by calculation, a larger value as the flow rate estimate of purge gas as a difference between the system pressure and the intake pipe pressure is larger.

In step S515, the diagnosis module 132 diagnoses a malfunction in the purge system 1. Specifically, the diagnosis module 132 diagnoses a malfunction in the purge system 1 on the basis of the relationship between a flow rate integrated value and system pressure. As described above, when the diagnosis mode is started, the outside air valve 31 enters a closed state. Hence, in a state where the outside air passage 40 is closed by the outside air valve 31, the diagnosis module 132 diagnoses a malfunction in the purge system 1 on the basis of the relationship between the flow rate integrated value and the system pressure.

For instance, in the case where system pressure when the flow rate integrated value has reached the reference integrated value is higher than a pressure threshold, the diagnosis module 132 makes a diagnosis that the purge system 1 is malfunctioning. Specifically, the pressure threshold may be set to a value that enables determination of whether an amount of decrease in system pressure until the flow rate integrated value reaches the reference integrated value is large enough for a determination that a purge flow is performed normally to be made, and stored in a memory element of the control device 100.

Figure 5:
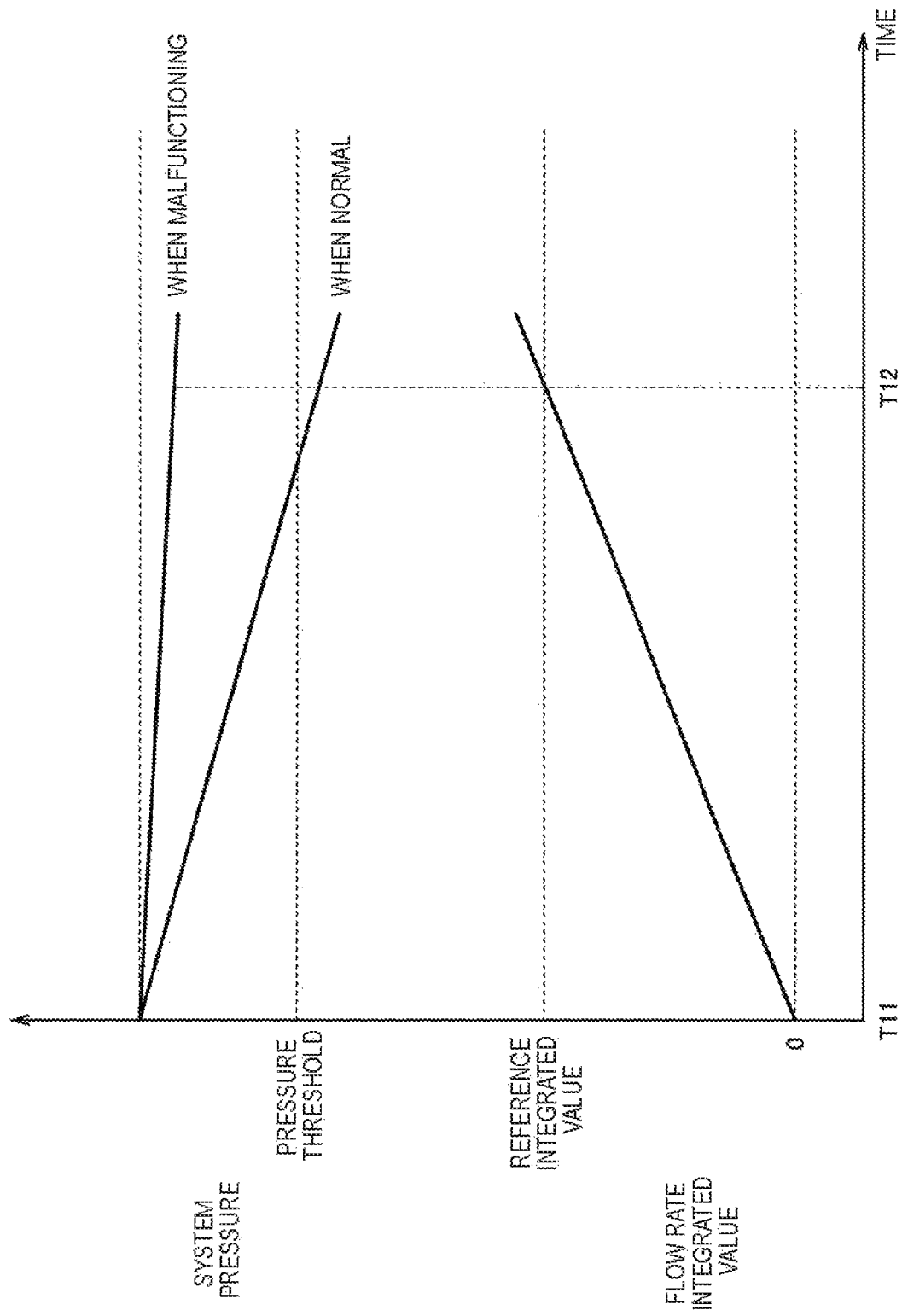
FIG. 5 is an explanatory diagram illustrating an instance of progression of system pressure and a flow rate integrated value in a diagnosis mode.

FIG. 5 is an explanatory diagram illustrating an instance of progression of system pressure and a flow rate integrated value in the diagnosis mode. In the case where the purge valve 19 is in an open state, a purge flow occurs, so that purge gas flows into the intake pipe 98 from the purge passage 17. Hence, for instance, in the case where the diagnosis mode is started at time T11, and the purge valve 19 continues to be in an open state after time T11, the flow rate integrated value may increase continuously after time T11, as illustrated in FIG. 5. Then, at time T12 when the flow rate integrated value reaches the reference integrated value, the flow rate integrated value determiner 136 determines that the flow rate integrated value has reached the reference integrated value. Thus, the diagnosis module 132 diagnoses a malfunction in the purge system 1 at time T12.

In the diagnosis mode, the outside air passage 40 is closed by the outside air valve 31. Hence, in the case where the purge valve 19 is in an open state, system pressure decreases by purge gas flowing into the intake pipe 98 from the purge passage 17. Hence, as illustrated in FIG. 5, system pressure may continuously decrease after time T11. Here, when the purge system 1 is malfunctioning and a purge flow is not performed normally (e.g., when a passage in the purge system 1 is clogged with a foreign body), a decrease speed of system pressure in the diagnosis mode is smaller than that when the purge system 1 is normal. Hence, when the purge system 1 is malfunctioning, system pressure is higher than the pressure threshold at time T12. On the other hand, when the purge system 1 is normal, a decrease speed of system pressure in the diagnosis mode is larger than that when the purge system 1 is malfunctioning. Hence, when the purge system 1 is normal, system pressure is equal to or less than the pressure threshold at time T12. Thus, the diagnosis module 132 can appropriately diagnose a malfunction in the purge system 1.

Note that in the case where a diagnosis that the purge system 1 is malfunctioning is made, the control device 100 reports a diagnosis result to a driver, for instance. In that case, specifically, the control device 100 may report to the driver that the purge system 1 is malfunctioning by controlling display by a display device such as a lamp or a display provided in the vehicle.

Next, in step S517, the execution module 130 ends the diagnosis mode. When the diagnosis mode ends, the outside air valve controller 131 switches the outside air valve 31 from a closed state to an open state. Thus, as illustrated in FIG. 1, the first passage 43a communicates with the fifth passage 43e, which causes the canister 13 to communicate with the outside air opening 21, and the outside air passage 40 is opened. In addition, the execution module 130 resets the flow rate integrated value.

In step S519, the execution module 130 prohibits the diagnosis mode. When the diagnosis mode is prohibited, the outside air valve controller 131 brings the outside air valve 31 into an open state. Thus, as illustrated in FIG. 1, the first passage 43a communicates with the fifth passage 43e, which causes the canister 13 to communicate with the outside air opening 21, and the outside air passage 40 is opened.

For instance, in the case where the determination result in step S505 is YES, the execution module 130 prohibits the diagnosis mode from being started. In addition, for instance, in the case where the determination result in step S511 is YES, the execution module 130 interrupts the diagnosis mode being executed. In this manner, the execution module 130 prohibits the diagnosis mode on the basis of a battery voltage. In this case, the execution module 130 resets the flow rate integrated value.

Here, as described above, the determination processing in step S505 is not performed in the case where the determination result in step S503 is YES. In addition, the determination processing in step S511 is not performed in the case where the determination result in step S509 is YES. Hence, when the engine 90 restarts after an automatic stop, the execution module 130 cancels the prohibition of the diagnosis mode based on the battery voltage.

The processing flow illustrated in FIG. 4 ends after step S517 or step S519.

Now, description will be given on progression of each state in the vehicle in regard to cases where diagnosis modes according to a reference example and the present example are executed. Note that, strictly speaking, there may be a gap in time of change between states that are described as changing at the same time in the following description.

Figure 6:
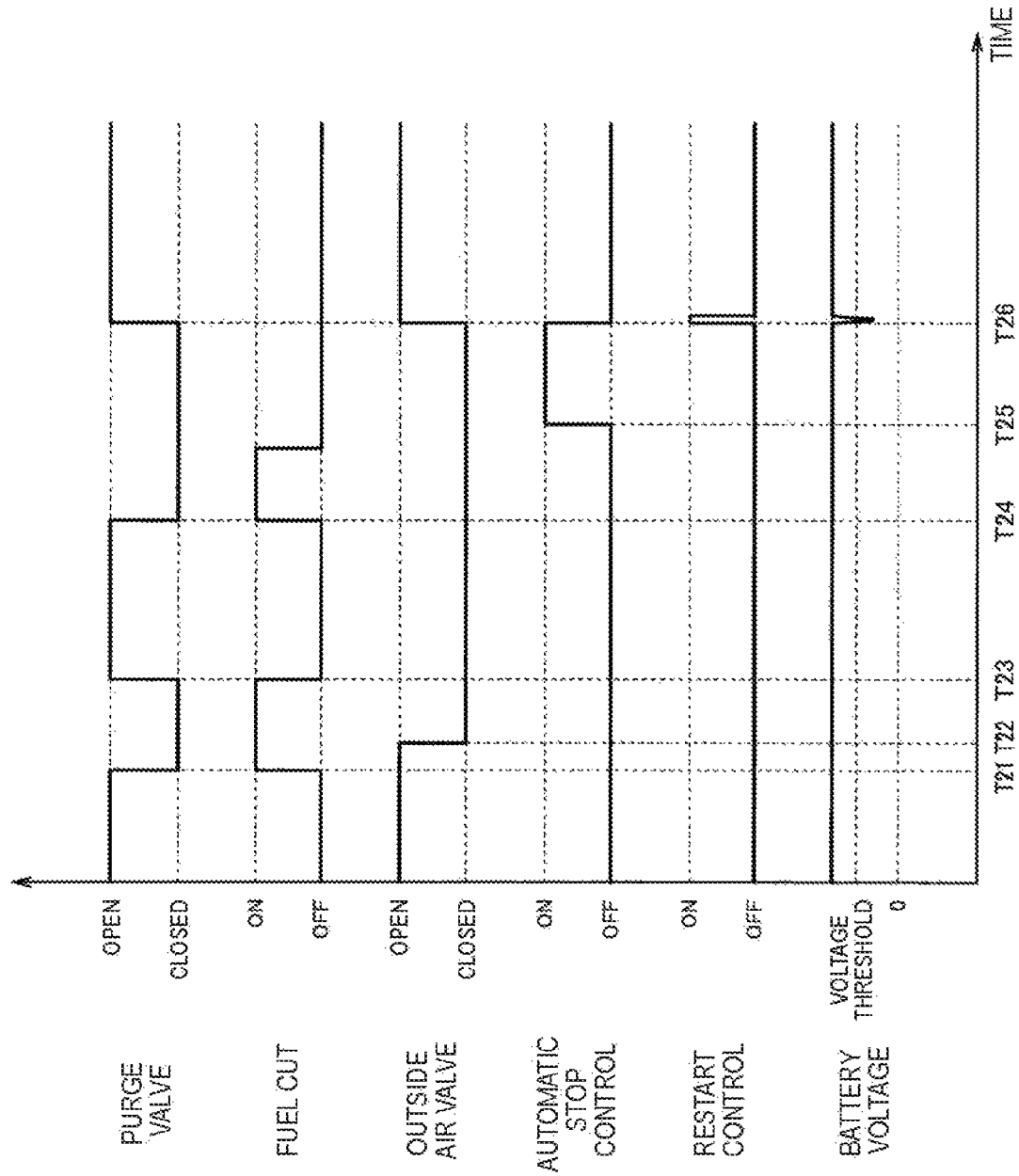
FIG. 6 is an explanatory diagram illustrating an instance of progression of each state in a vehicle in regard to a case where a diagnosis mode according to a reference example is executed.
Figure 7:
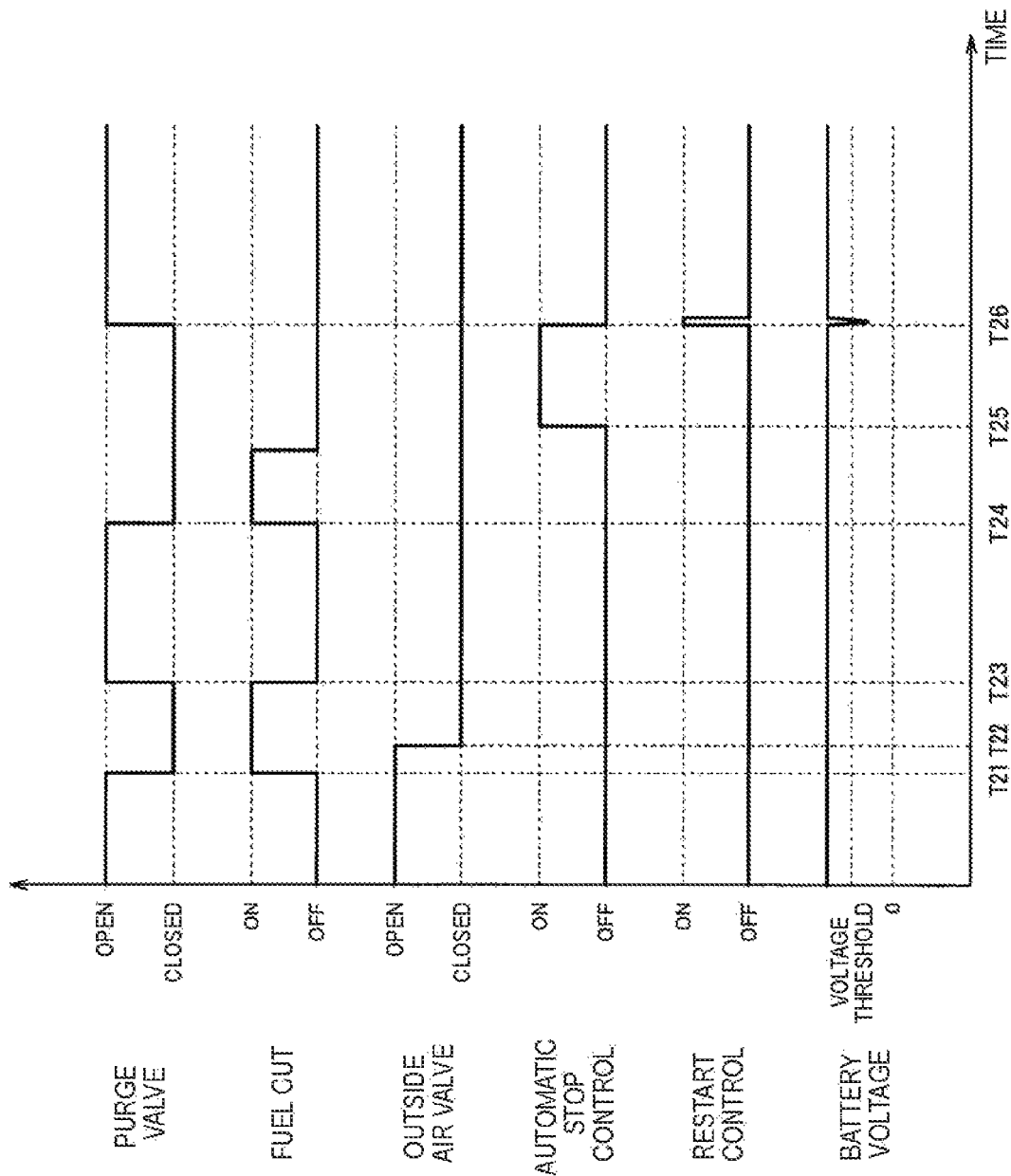
FIG. 7 is an explanatory diagram illustrating an instance of progression of each state in a vehicle in regard to a case where a diagnosis mode according to an example of the present invention is executed.

FIG. 6 is an explanatory diagram illustrating an instance of progression of each state in the vehicle in regard to a case where a diagnosis mode according to a reference example is executed. FIG. 7 is an explanatory diagram illustrating an instance of progression of each state in the vehicle in regard to a case where a diagnosis mode according to the present example is executed. FIGS. 6 and 7 illustrate, as the states in the vehicle, an open/closed state of the purge valve 19, an execution state of fuel cut, an open/closed state of the outside air valve 31, an execution state of automatic stop control of the engine 90, an execution state of restart control of the engine 90, and a battery voltage. In addition, FIGS. 6 and 7 illustrate progression of each state when elapse of reference time from a point in time when fuel cut of stopping supply of fuel to the engine 90 is started is applied as a start condition that is a condition under which the diagnosis mode is started.

In the reference example, as in the present example, a diagnosis mode of diagnosing a malfunction in the purge system 1 is executed on the basis of the relationship between the flow rate integrated value and the system pressure in a state where the outside air passage 40 is closed by the outside air valve 31. In addition, the diagnosis mode is prohibited in the case where the battery voltage is lower than the voltage threshold. However, in the reference example, unlike the present example, prohibition of the diagnosis mode based on the battery voltage is not canceled even when the engine 90 restarts after an automatic stop.

For instance, as illustrated in FIG. 6, at time T21 while the vehicle is traveling, fuel cut is started. Then, at time T22 when reference time has elapsed from time T21, the diagnosis mode is started by the start condition being satisfied, and the outside air valve 31 is switched from an open state to a closed state. After that, for instance, as in time between time T23 and time T24, the purge valve 19 enters an open state and a purge flow occurs, so that an increase in flow rate integrated value and a decrease in system pressure proceed.

For instance, in the case where the vehicle starts deceleration at time T24, the vehicle stops after fuel cut is performed. Then, at time T25 when the automatic stop condition is satisfied, automatic stop control of the engine 90 is started. After that, at time T26, in the case where the restart condition is satisfied by depression of an acceleration pedal, or the like, restart control of the engine 90 is started. Here, when the engine 90 restarts, a relatively large current flows from the battery 87 to the starter motor 86; thus, as illustrated in FIG. 6, the battery voltage temporarily decreases. Thus, the diagnosis mode is interrupted by the battery voltage falling below the voltage threshold, and the outside air valve 31 is switched from a closed state to an open state. Hence, calculation of the flow rate integrated value is interrupted, and the flow rate integrated value stored in the memory element of the control device 100, for instance, is reset. In addition, system pressure returns to a value relatively close to atmospheric pressure.

On the other hand, in the present example, as described above, the prohibition of the diagnosis mode based on the battery voltage is cancelled when the engine 90 restarts after an automatic stop. Thus, as illustrated in FIG. 7, at time T26, even in the case where the battery voltage falls below the voltage threshold by restart control of the engine 90 being started, the diagnosis mode is continued, and the outside air valve 31 is kept in a closed state. Hence, at time T26, a purge flow occurs by the purge valve 19 being switched from a closed state to an open state by acceleration of the vehicle, so that an increase in flow rate integrated value and a decrease in system pressure start again. Thus, in the present example, in the case where the diagnosis mode is continued at the time of an automatic stop of the engine 90, the execution module 130 may continue the diagnosis mode regardless of the battery voltage when the engine 90 restarts.

Figure 8:
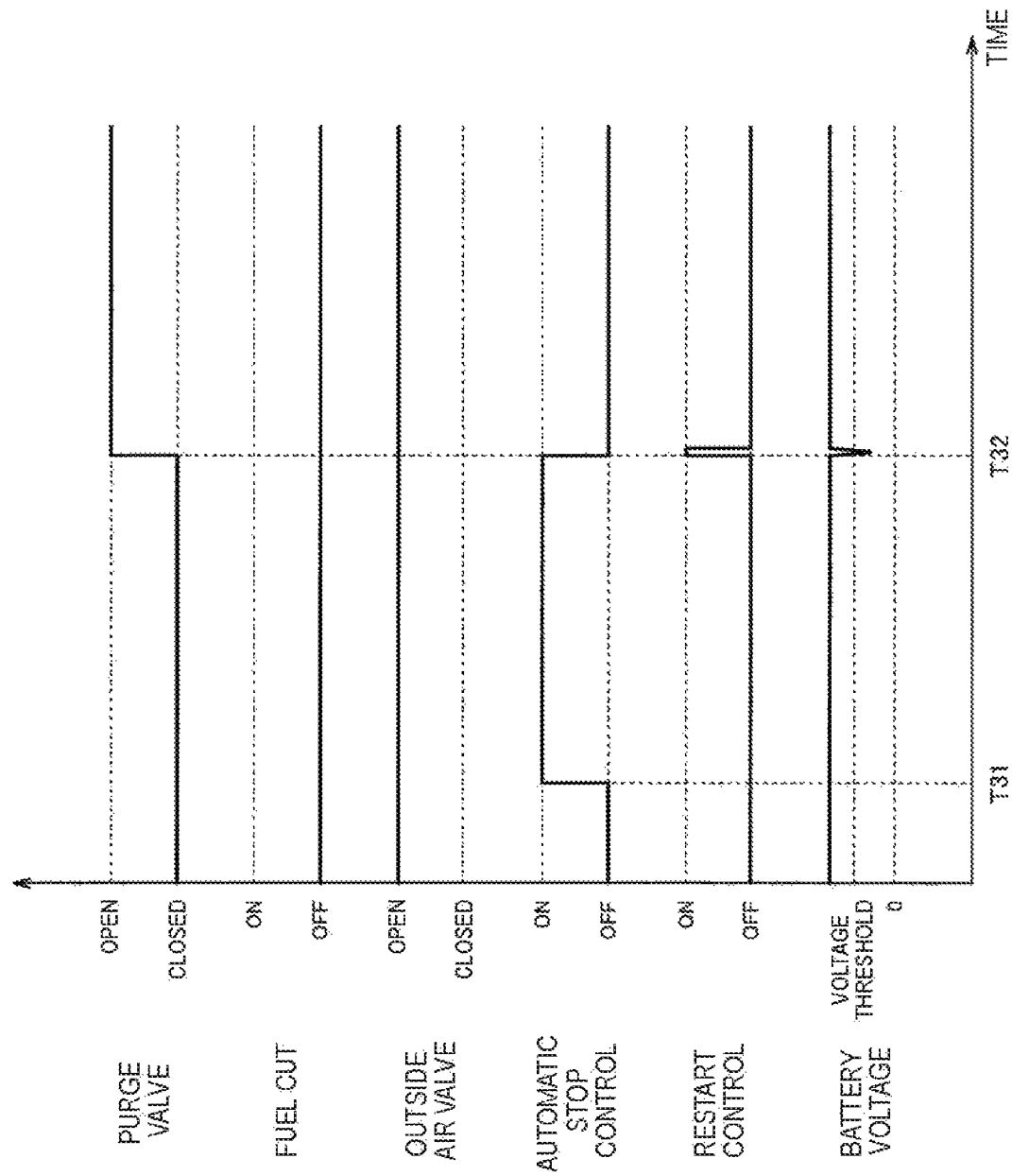
FIG. 8 is an explanatory diagram illustrating an instance of progression of each state in a vehicle in regard to a case where a diagnosis mode according to a reference example is executed.
Figure 9:
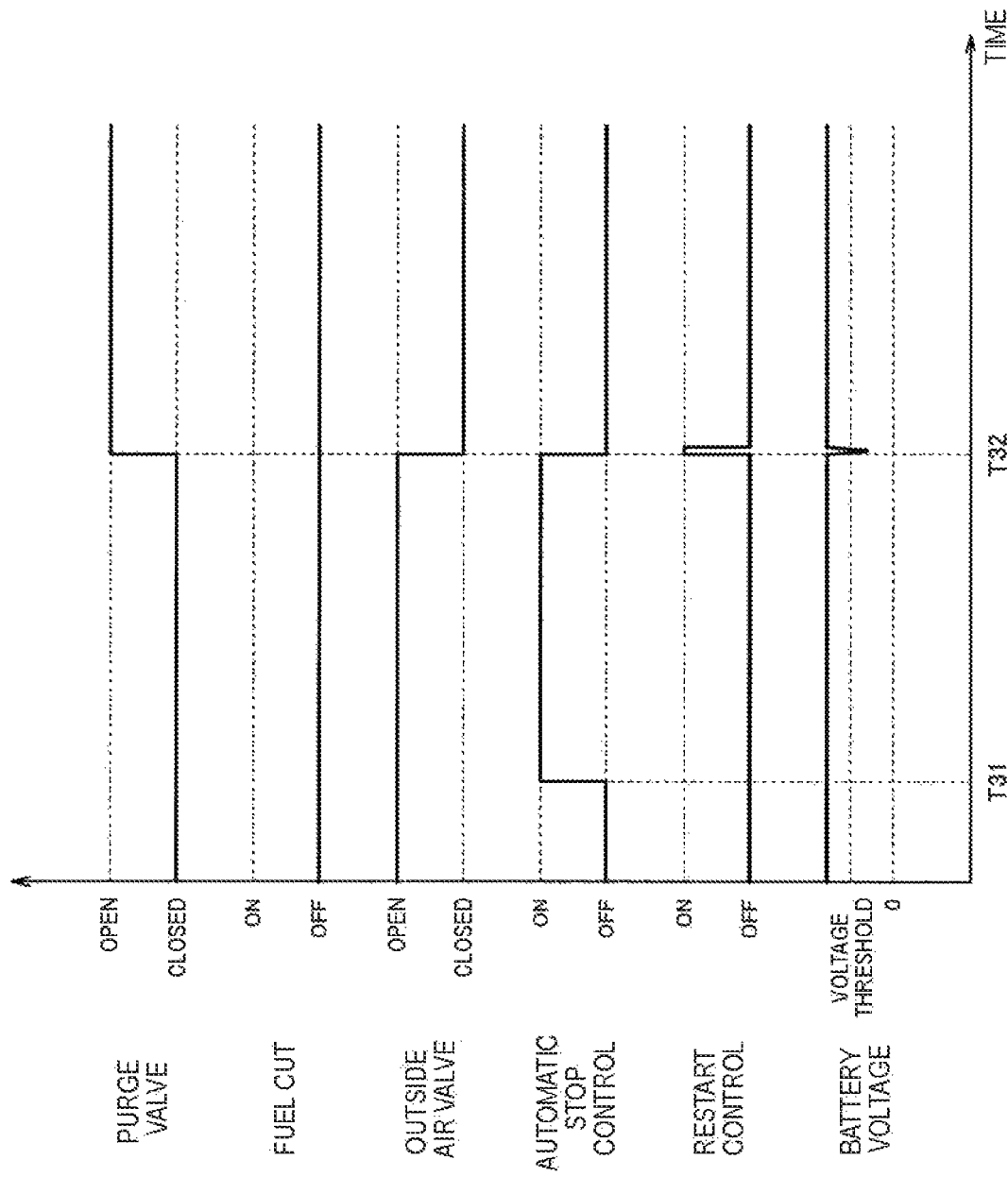
FIG. 9 is an explanatory diagram illustrating an instance of progression of each state in a vehicle in regard to a case where a diagnosis mode according to an example of the present invention is executed.

FIG. 8 is an explanatory diagram illustrating an instance different from FIG. 6 of progression of each state in the vehicle in regard to a case where a diagnosis mode according to a reference example is executed. FIG. 9 is an explanatory diagram illustrating an instance different from FIG. 7 of progression of each state in the vehicle in regard to a case where a diagnosis mode according to the present example is executed. Like FIGS. 6 and 7. FIGS. 8 and 9 illustrate, as the states in the vehicle, an open/closed state of the purge valve 19, an execution state of fuel cut, an open/closed state of the outside air valve 31, an execution state of automatic stop control of the engine 90, an execution state of restart control of the engine 90, and a battery voltage. In addition. FIGS. 8 and 9 illustrate progression of each state when switching of the purge valve 19 from a closed state to an open state is applied as a start condition that is a condition under which the diagnosis mode is started.

For instance, in the case where the vehicle that is traveling decelerates and then stops, and the automatic stop condition is satisfied at time T31, automatic stop control of the engine 90 is started, as illustrated in FIG. 8. In the instance illustrated in FIG. 8, the diagnosis mode is not started at the time of an automatic stop of the engine 90; hence, at time T31, the outside air valve 31 is in an open state. After that, at time T32, in the case where the restart condition is satisfied by depression of an acceleration pedal, or the like, restart control of the engine 90 is started. In addition, at time T32, the start condition is satisfied by the purge valve 19 being switched from a closed state to an open state by acceleration of the vehicle. However, a restart of the engine 90 causes the battery voltage to temporarily decrease, so that the battery voltage falls below the voltage threshold, thus, the diagnosis mode is prohibited from being started, and the outside air valve 31 is kept in an open state.

On the other hand, in the present example, as described above, the prohibition of the diagnosis mode based on the battery voltage is cancelled when the engine 90 restarts after an automatic stop. Thus, as illustrated in FIG. 9, at time T32, even in the case where the battery voltage falls below the voltage threshold by restart control of the engine 90 being started, the diagnosis mode is started, and the outside air valve 31 is switched from an open state to a closed state. Hence, at time T32, a purge flow occurs by the purge valve 19 being switched from a closed state to an open state by acceleration of the vehicle, so that an increase in flow rate integrated value and a decrease in system pressure start. Thus, in the present example, in the case where the start condition that is a condition under which the diagnosis mode is started is satisfied at the time of a restart of the engine 90, the execution module 130 may start the diagnosis mode regardless of the battery voltage when the engine 90 restarts.

3. EFFECT OF CONTROL DEVICE

Now, an effect of the control device 100 according to the present example will be described.

In the control device 100 according to the present example, the diagnosis mode of diagnosing a malfunction in the purge system 1 is executed on the basis of the relationship between a flow rate integrated value and system pressure in a state where the outside air passage 40 is closed by the outside air valve 31. In addition, the diagnosis mode is prohibited on the basis of a battery voltage. This makes it possible to suppress execution of the diagnosis mode involving operation of the outside air valve 31 in a situation in which it is difficult to appropriately control the operation of the outside air valve 31. Here, in the control device 100 according to the present example, when the engine 90 restarts after an automatic stop, prohibition of the diagnosis mode based on the battery voltage is canceled. This makes it possible to suppress prohibition of the diagnosis mode caused by a temporary decrease in battery voltage due to a restart of the engine 90. Hence, unnecessary interruption of the diagnosis mode before completion of diagnosis of a malfunction in the purge system 1 is suppressed. Thus, the diagnosis of a malfunction in the purge system 1 can be completed appropriately.

In addition, in the control device 100 according to the present example, the diagnosis mode may be prohibited in the case where the battery voltage is lower than the voltage threshold. This makes it possible to appropriately suppress execution of the diagnosis mode involving operation of the outside air valve 31 in a situation in which it is difficult to appropriately control the operation of the outside air valve 31.

In addition, in the control device 100 according to the present example, in the case where the diagnosis mode is continued at the time of an automatic stop of the engine 90, the diagnosis mode may be continued regardless of the battery voltage when the engine 90 restarts. This makes it possible to suppress interruption of the diagnosis mode started before an automatic stop of the engine 90 due to a restart of the engine 90. Thus, the diagnosis of a malfunction in the purge system 1 can be completed further appropriately.

In addition, in the control device 100 according to the present example, in the case where the start condition that is a condition under which the diagnosis mode is started is satisfied at the time of a restart of the engine 90, the diagnosis mode may be started regardless of the battery voltage when the engine 90 restarts. This makes it possible to suppress prohibition of start of the diagnosis mode due to a restart of the engine 90. Thus, the diagnosis of a malfunction in the purge system 1 can be completed further appropriately.

In addition, in the control device 100 according to the present example, in the diagnosis mode, in the case where system pressure when the flow rate integrated value has reached the reference integrated value is higher than a pressure threshold, a diagnosis that the purge system 1 is malfunctioning may be made. This makes it possible to appropriately make a diagnosis that the purge system 1 is malfunctioning in a situation in which a purge flow is not performed normally.

4. CONCLUSION

As described above, according to the present example, the diagnosis mode of diagnosing a malfunction in the purge system 1 is executed on the basis of the relationship between a flow rate integrated value and system pressure in a state where the outside air passage 40 is closed by the outside air valve 31. In addition, the diagnosis mode is prohibited on the basis of a battery voltage. In addition, according to the present example, when the engine 90 restarts after an automatic stop, prohibition of the diagnosis mode based on the battery voltage is canceled. This makes it possible to suppress prohibition of the diagnosis mode caused by a temporary decrease in battery voltage due to a restart of the engine 90. Hence, unnecessary interruption of the diagnosis mode before completion of diagnosis of a malfunction in the purge system 1 is suppressed. Thus, the diagnosis of a malfunction in the purge system 1 can be completed appropriately.

A specific configuration example of the purge system 1 is described above with reference to FIG. 1, but a purge system according to an example of the present invention is not limited to such an instance. For instance, the leak detection device 30 may be omitted from the configuration of the purge system 1. In that case, for instance, the outside air passage 40 that causes the canister 13 to communicate with the outside air opening 21 is provided with an outside air valve capable of opening and closing the outside air passage 40. In addition, dimensions and shapes of the components, positional relationships between the components, and paths of the passages illustrated in FIG. 1 are merely instances, and are not limited to such instances.

In addition, the control device 100 is described above as an instance of a device that functions as a malfunction diagnosis device, but the device that functions as a malfunction diagnosis device is not limited to such an instance. For instance, the device that functions as a malfunction diagnosis device does not need to have functions of the purge valve controller 110 and the pump controller 120 in the control device 100.

Note that it is not necessary for the processing described in this specification with reference to the flowchart to be executed in the order illustrated in the flowchart. Some processing steps may be performed in parallel. Further, some of additional steps can be adopted, or some processing steps can be omitted.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A purge system malfunction diagnosis device configured to diagnose a malfunction in a purge system mounted on a vehicle configured to execute an idling stop control of automatically stopping and restarting an engine, the purge system being configured to supply a purge gas including an evaporated fuel generated in a fuel tank to an intake pipe of the engine and comprising a canister configured to adsorb the evaporated fuel,
a purge passage configured to cause the canister to communicate with the intake pipe of the engine,
a purge valve capable of opening and closing the purge passage,
an outside air passage configured to cause the canister to communicate with an outside air opening,
an outside air valve capable of opening and closing the outside air passage by being driven using an electric power supplied from a battery configured to store an electric power to be used for a start of the engine, and
a system pressure sensor configured to detect a pressure in the purge system, the purge system malfunction diagnosis device comprising:
an execution module configured to, in a state where the outside air passage is closed by the outside air valve, execute a diagnosis mode of diagnosing a malfunction in the purge system on a basis of a relationship between the pressure in the purge system and an integrated value of flow rate estimates of a purge gas that flows into the intake pipe from the purge passage by the purge passage being opened by the purge valve, and prohibit the diagnosis mode on a basis of a voltage of the battery, wherein the execution module cancels the prohibition of the diagnosis mode based on the voltage of the battery when the engine restarts after an automatic stop.

2. The purge system malfunction diagnosis device according to claim 1, wherein the execution module prohibits the diagnosis mode in a case where the voltage of the battery is lower than a voltage threshold.

3. The purge system malfunction diagnosis device according to claim 1, wherein in a case where the diagnosis mode is continued at a time of an automatic stop of the engine, the execution module continues the diagnosis mode regardless of the voltage of the battery when the engine restarts.

4. The purge system malfunction diagnosis device according to claim 2, wherein in a case where the diagnosis mode is continued at a time of an automatic stop of the engine, the execution module continues the diagnosis mode regardless of the voltage of the battery when the engine restarts.

5. The purge system malfunction diagnosis device according to claim 1, wherein in a case where a start condition that is a condition under which the diagnosis mode is started is satisfied at a time of a restart of the engine, the execution module starts the diagnosis mode regardless of the voltage of the battery when the engine restarts.

6. The purge system malfunction diagnosis device according to claim 2, wherein in a case where a start condition that is a condition under which the diagnosis mode is started is satisfied at a time of a restart of the engine, the execution module starts the diagnosis mode regardless of the voltage of the battery when the engine restarts.

7. The purge system malfunction diagnosis device according to claim 3, wherein in a case where a start condition that is a condition under which the diagnosis mode is started is satisfied at a time of a restart of the engine, the execution module starts the diagnosis mode regardless of the voltage of the battery when the engine restarts.

8. The purge system malfunction diagnosis device according to claim 4, wherein in a case where a start condition that is a condition under which the diagnosis mode is started is satisfied at a time of a restart of the engine, the execution module starts the diagnosis mode regardless of the voltage of the battery when the engine restarts.

9. The purge system malfunction diagnosis device according to claim 1, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

10. The purge system malfunction diagnosis device according to claim 2, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

11. The purge system malfunction diagnosis device according to claim 3, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

12. The purge system malfunction diagnosis device according to claim 4, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

13. The purge system malfunction diagnosis device according to claim 5, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

14. The purge system malfunction diagnosis device according to claim 6, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

15. The purge system malfunction diagnosis device according to claim 7, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

16. The purge system malfunction diagnosis device according to claim 8, wherein the execution module makes a diagnosis that the purge system is malfunctioning in a case where, in the diagnosis mode, a pressure in the purge system when the integrated value of the flow rate estimates has reached a reference integrated value is higher than a pressure threshold.

17. A purge system malfunction diagnosis device configured to diagnose a malfunction in a purge system mounted on a vehicle configured to execute an idling stop control of automatically stopping and restarting an engine, the purge system being configured to supply a purge gas including an evaporated fuel generated in a fuel tank to an intake pipe of the engine and comprising
a canister configured to adsorb the evaporated fuel,
a purge passage configured to cause the canister to communicate with the intake pipe of the engine,
a purge valve capable of opening and closing the purge passage,
an outside air passage configured to cause the canister to communicate with an outside air opening,
an outside air valve capable of opening and closing the outside air passage by being driven using an electric power supplied from a battery configured to store an electric power to be used for a start of the engine, and
a system pressure sensor configured to detect a pressure in the purge system, the purge system malfunction diagnosis device comprising circuitry configured to, in a state where the outside air passage is closed by the outside air valve, execute a diagnosis mode of diagnosing a malfunction in the purge system on a basis of a relationship between the pressure in the purge system and an integrated value of flow rate estimates of a purge gas that flows into the intake pipe from the purge passage by the purge passage being opened by the purge valve, and prohibit the diagnosis mode on a basis of a voltage of the battery,
wherein the circuitry cancels the prohibition of the diagnosis mode based on the voltage of the battery when the engine restarts after an automatic stop.

* * * * *